J. Hall.
Stove-Pipe Thimble.

Nº 89,403.        Patented Apr. 27, 1869.

Witnesses:

Inventor:
J. Hall.
Attorneys.

JOHN HALL, OF BOSTON, MASSACHUSETTS.

Letters Patent No. 89,403, dated April 27, 1869.

IMPROVEMENT IN STOVE-PIPE FOR DECKS OF VESSELS.

The Schedule referred to in these Letters Patent and making part of the same.

*To all whom it may concern:*

Be it known that I, JOHN HALL, of Boston, in the county of Suffolk, and State of Massachusetts, have invented a new and improved Deck Stove-Pipe for Vessels; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
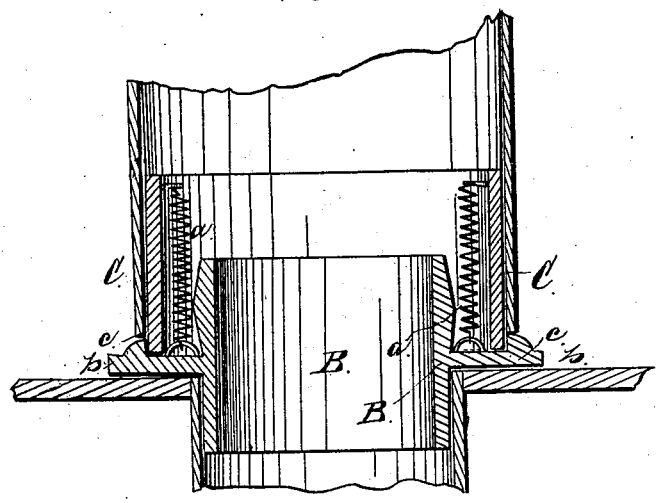
Figure 1 represents a sectional elevation of my improved deck stove-pipe.
Figure 2:
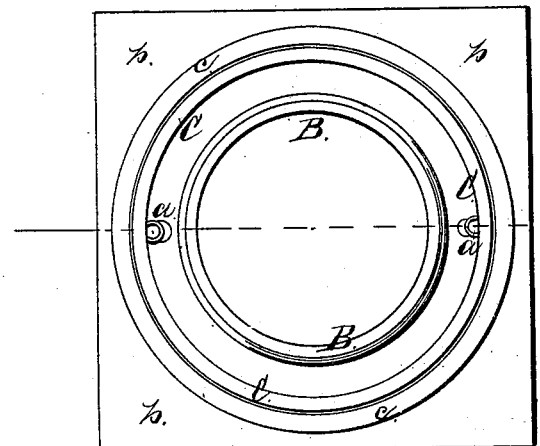
Figure 2 is a plan or top view of the same.

This invention relates to a new device for making the stove-pipes on the decks of vessels flexible, to prevent their being injured when struck by swinging booms, yards, or other devices.

When they are rigidly attached, as heretofore, it often or generally happens that, especially on cabins, galleys, and forecastles, they are bent, broken, or otherwise injured, by booms or yards, or that the decks, from which they project, become leaky by the strain brought to bear on them.

My invention consists in the application of springs $a\ a$, which connect a piece of pipe, B, that is securely fastened to the deck of a cabin, galley, or other part of the ship, with the upper part of the stove-pipe C, or with a short pipe, to which the said upper pipe is secured.

The fixed pipe B has a flange $b$, by which it can be secured to the deck, and the flange may have a rim, $c$, to keep the pipe C in place.

When the upper projecting pipe is struck by a boom, or otherwise, it will be allowed to tip, and when the strain is over, it will, by the springs $a$, be drawn back to the proper position.

Having thus described my invention,

I claim as new, and desire to secure by Letters Patent—

A deck stove-pipe for ships, when made flexible, by being connected by springs $a$, with a fixed supporting-pipe, B, substantially as herein shown and described.

JOHN HALL.

Witnesses:
 JNO. WELTCH,
 D. HOWARD BILLS.